United States Patent [19]

Jones

[11] 3,946,138

[45] Mar. 23, 1976

[54] COMPOSITIONS AND METHODS RELATING TO TRANSFER PROCESSES

[75] Inventor: Frederick L. Jones, Dayton, Ohio

[73] Assignee: Monarch Marking Systems, Inc., Dayton, Ohio

[22] Filed: Apr. 1, 1974

[21] Appl. No.: 456,718

[52] U.S. Cl. .................... 428/514; 106/22; 106/27; 427/372; 427/385; 427/391; 428/483; 428/511; 428/522

[51] Int. Cl.$^2$ B32B 27/30; B32B 27/36; B41M 5/02

[58] Field of Search ........... 117/36.1, 36.2, 3.5, 3.6, 117/38; 106/22, 23, 25, 26–28, 32; 260/29.6 WA; 428/411, 511, 522; 427/372, 385, 391, 395

[56] References Cited

UNITED STATES PATENTS

| | | | |
|---|---|---|---|
| 2,138,836 | 12/1938 | Brower | 106/27 |
| 2,324,671 | 7/1943 | Bernstein | 106/29 |
| 3,037,879 | 5/1962 | Newman et al. | 117/36.1 |
| 3,207,621 | 9/1965 | Newman et al. | 117/36.1 |
| 3,330,791 | 7/1967 | Mater et al. | 260/28 |
| 3,467,539 | 9/1969 | Schlotzhauer et al. | 117/36.1 |
| 3,484,264 | 12/1969 | Strauss et al. | 117/36.1 |
| 3,520,713 | 7/1970 | Sala et al. | 117/36.1 |
| 3,597,244 | 8/1971 | Fookson et al. | 106/22 |
| 3,639,310 | 2/1972 | Andrews | 260/17 R |
| 3,715,219 | 2/1973 | Kurz et al. | 106/22 |

*Primary Examiner*—P. E. Willis, Jr.
*Attorney, Agent, or Firm*—Jones, Tullar & Cooper

[57] ABSTRACT

This invention relates to inks, ink emulsions, and to transfer elements as well as their methods of manufacture. The transfer elements provided by the invention are useful in providing imprints, including infra-red scannable imprints which are sharp, well defined prints with no feathering and which have fast dry and have excellent smudge resistance. The transfer elements comprise a substantially non-absorbent base having a coating comprising a continuous phase containing, as a discontinuous phase, a colorant carried by a vehicle comprising at least one $C_{12}$ to $C_{20}$ alcohol, said vehicle having a melting point below about 20°C.

19 Claims, No Drawings

COMPOSITIONS AND METHODS RELATING TO TRANSFER PROCESSES

DESCRIPTION OF THE INVENTION

It has now been found that transfer elements, such as typewriter ribbons and carbon papers especially useful in automatic data printing typewriters, as well as serial and line printers producing sharp, clear images including infrared scannable images, can be formed which comprise a substantially non-absorbent thin base such as treated paper, fabric or plastic film base, preferably a polyester film such as Mylar, having a coating thereon comprising a continuous phase, which comprises a partially hydrolyzed polyvinyl acetate, having dispersed therein as a discontinuous phase a pressure expressible mixture comprising a colorant dispersed in a vehicle comprising at least one $C_{12}$ to $C_{20}$ carbon atom containing aliphatic alcohol containing an even number of carbon atoms, or mixtures thereof, said dispersant having a freezing point less than about 25°C. and preferably less than about 15°C. Preferably, the dispersant comprises oleyl alcohol.

This invention relates in one aspect to an ink, in another aspect to aqueous emulsion comprising a continuous resin containing phase and a discontinuous ink containing phase, in yet another aspect to transfer elements and their methods of manufacture.

The prior art transfer elements, while in some cases yeilding useful properties, have demonstrated one or more drawbacks, including cost, the use of volatile organic solvents, difficulties in preparing the transfer elements, poor handling qualities, including narrow ranges of useful temperature; the quality of the print formed, for example, lack of sharpness due to feathering, or poor drying, or smudging or transferring when handled, either manually or mechanically.

In order to form pressure expressible films, the ink or image forming materials must be incompatible with the continuous polymer film so that discrete ink filled pores are more or less uniformly dispersed throughout the polymer film. When deliberate localized pressure is applied to the polymer film, the ink is expressed from these pores to form an image upon an image receiving article such as paper. Since the ink is hydrophobic in nature, in order to obtain incompatibility, the continuous polymer film is preferably a hydrophilic material.

The polymer employed, as the continuous phase of the ink bearing layer in the present image producing transfer elements, is a partially hydrolyzed polyvinyl acetate, which may be also considered as a copolymer of vinyl alcohol and vinyl acetate. The preferred polymers are hydrolyzed to the extent of from about 80 to about 95% and most preferably from about 85 to 90%. It has been found that these polymers provide both desirable characteristics as an ink carrier film, while providing compositions which are readily coatable upon the plastic base or support material.

In the transfer elements, the continuous film, comprising partially hydrolyzed polyvinyl acetate, has dispersed therein, as a discontinuous phase, a pressure expressible ink or image producing material.

The inks useful in the transfer elements of the invention comprise at least one colorant, that is either a dye or pigment or any combination of two or more thereof, including virtually all of the oil soluble dyes or pigments conventionally employed in the ink art, dispersed in a dispersant.

The vehicle comprises at least one $C_{12}$ to $C_{20}$ carbon atom containing aliphatic monoalcohol containing an even number of carbon atoms, or mixtures thereof, said vehicle having a freezing point less than about 20°C. and preferably less than about 15°C. Preferably, the dispersant comprises oleyl alcohol. Useful aliphatic saturated and olefinically unsaturated fatty alcohols, cetyl alcohol, myristic alcohol, stearyl alcohol, and alcohols derived from linoleic acid and linolenic acid.

The colorants which can be employed include salts of basic azo and amino-azo dyes, such as azo-black, the azine dyes, such as the indulines and the nigrosines, methyl violet base, fuchsin, anthraquinone dyes, and the like, with organic acids, preferably a fatty acid. Pigments, such as carbon black or other insoluble inorganic colorants, may be employed either alone or in combination with a dye. Examples of such colorants include chrome yellow, copper phthalocyanine, iron blue and the like.

The presently preferred colorant comprises a nigrosine base colorant admixed with a fatty acid developer. The preferred fatty acid is oleic acid. Other fatty acids include stearic acid, palmitic acid, lauric acid and the like.

Where a fatty acid dye base salt is employed, proportions of the dye base, for example, nigrosine, and fatty acid are selected so that at least a substantial color developing amount of a dye base fatty acid salt is formed, for example, the material known as nigrosine oleate. The amount of fatty acid employed, however, should be no more than, and preferably less than, that amount which forms a non-separating combination or salt with the dye base colorant. Said another way, the amount of fatty acid employed is less than that amount necessary to fully develop the dye base colorant. The use of excess fatty acid above this amount results in a reduction of the sharpness of the image produced by the transfer element. With nigrosine and similar materials, the exact amount of fatty acid employed varies, in part, on the color intensity desired in the image produced. Typically, a weight of fatty acid about one-half the weight of the nigrosine base color is employed.

The colorant, for example, the above dye base-fatty acid combination, is dispersed in the alcohol vehicle. The alcohol dispersant provides numerous benefits. While substantially non-volatile, therefore, not producing objectionable organic solvent vapors, the vehicle remains a fluid material, which acts as an efficient carrier, through the temperature ranges desirable for use in the transfer elements. Further, for example, the nigrosine base-vehicle mixture is relatively colorless so that the penetration or migration of vehicle from the image formed by the transfer element on a vehicle absorbent image receiving article does not result in a diminution of image sharpness. The amount of alcohol vehicle employed in the ink or image forming mixture is generally at least about 40% by weight of the ink mixture in order to ensure ready expressibility of the ink. Typically, between about 40% and about 90% alcohol vehicle and preferably between about 40% and about 85% by weight of the ink mixture is vehicle.

The proportion of the continuous polymer phase and the discontinuous ink phase in the image forming layer of the transfer element varies, in part, upon the specific material employed and the intended use of the transfer element. Generally, however, the weight proportion of continuous phase to the ink composition is between about 1:1 and about 1:3 and preferably between about 1:1.5 to about 1:2.5.

The tranfer elements of this invention are prepared by forming an aqueous solution of the partially hydrolyzed polyvinyl acetate in water. The proportions are not unduly critical. Since, however, a noticeable increase in viscosity is noted, it is usually desirable to form a relatively dilute solution in the order of about 5 to about 20% solids.

To the resin solution there is then added, and dispersed therein, the ink or image forming material comprising colorant and vehicle, as described above. There is formed a stable oil in water emulsion. The amount of the ink added is that amount necessary to provide the polymer ink ratios in the final deposited film set forth above.

Likewise, stable emulsions are formed without the aid of an additional surfactant or emulsifier, although one may be employed, if desired. There may also be employed such amounts of ammonium hydroxide which may, in fact, serve as a surfactant, although its function is not fully understood. The addition of smaller amounts, in the order of five percent or less based on the total composition, of ammonium hydroxide to the coating emulsions moderately decreases the ink transfer rate and can be used to enhance the quality of a multiple-use sheet.

The transfer properties of the transfer element, formed as described herein, can be modified, if desired, by incorporation into the emulsion of minor transfer rate modifying amounts of a modifier resin. For example, it has been found that the addition of minor amounts of polyvinyl alcohol (fully hydrolyzed polyvinyl acetate), usually added to the initial polymer solution, above, increases the ink transfer rate of a given system; whereas, the addition of minor amounts of polyvinyl acetate, usually in the form of an emulsion added to the emulsion formed above, decreases the ink transfer rate of a given system. Usually, when such modifier resins are employed, there is employed in a minor effective transfer rate modifying amount less than the amount of the primary resin and preferably usually less than about 25% by weight of the primary partialy hydrolyzed polyvinyl acetate polymer. The preferred amount employed depends, in part, on the particular compositions employed and the desired transfer rate.

Several adjuvants have been found which modify the appearance or properties of the transfer elements. The inclusion into the compositions of a dispersion of a particulate starch or chemically modified starches confers strength, bodying, resilience and desirable texture to the transfer films and imparts a clean and dry appearance and feel. Corn starch or other similar starches may be employed, as well as chemically modified starches such as starch hydroxyalkyl ethers, such as hydroxyether derivatives of corn starch prepared in accordance with the teachings of U.S. Pat. Nos. 2,516,622; 2,516,623, and 2,516,624. Likewise, other particulate filler which can be utilized to achieve similar results include inert inorganic particulate fillers such as fuller's earth, clays and calcium carbonate. The amount of such particulate adjuvants employed in usually an amount up to about the weight of the film forming resin employed, although, if desired, larger amounts can be employed.

Other adjuvants which have been found to modify the properties of the transfer elements are polyvalent metal salts such as those used to coagulate rubber latexes. Examples of such salts are described in U.S. Pat. No. 1,908,719 which is hereby incorporated by reference. A particularly useful polyvalent metal salt is copper sulfate. The amount of a polyvalent metal salt employed is a relatively minor amount which does not significantly interfere with the solubility of the partially hydrolyzed polyvinyl acetate in the relatively dilute emulsion, yet which decreases the solubility of the final resin film upon evaporation of water.

The transfer elements are prepared by applying to plastic sheets or ribbons, preferably a polyester, such as Mylar, a continuous coating of the aqueous emulsion and allowing the coating to dry. The drying is conducted either at room temperature or preferably at modestly elevated temperatures up to about 180°F. or higher depending on the specific compositions and the length of heating.

The coatings can be conveniently applied to the plastic substrate by the use of the technique known in the art as the use of a Mayer-rod which is drawn across the plastic through a supply of the emulsion; thereby providing a smooth continuous film. It has been noted, at least in some instances, that, when the emulsions are slowly Mayer-rod coated on a hydrophobic plastic substrate, such as Mylar, the emulsion may not completely wet the surface and a discontinuous film is encountered. However, when the same emulsion is applied to the same plastic substrate by the same Mayer-rod, but when the Mayer-rod is more rapidly moved across the substrate, the coating wets the substrate and there results a smooth, uniform, continuous coating. Apparently, application properties of the emulsions are enhanced where the emulsion is coated in a manner which creates turbulence or agitation of the emulsion sufficient to increase the contact of the surface of substrate with the dispersed hydrophobic ink phase of the emulsion, thereby enhancing the wetting out of the hydrophobic plastic substrate by the aqueous emulsion.

There follows several examples which describe embodiments of the invention. These examples should be considered illustrative rather than limiting. All parts and percentages in the examples are by weight unless otherwise specified. All temperatures are degrees Fahrenheit unless otherwise specified.

EXAMPLE I

An ink composition was formed by admixing 30 parts of dodecyl alcohol (Procter and Gamble S-1298), 40 parts of oleyl alcohol (Ashland Oil-Adol 320), 20 parts of nigrosine base (GAF-Nigrosine NB Base) and 10 parts of oleic acid (Emery Industries-Emersol 211).

EXAMPLE II

An ink composition was formed by admixing 55 parts of oleyl alcohol (cosmetic grade-Adol 90—cloud point 5°C. max.), 30 parts of Nigrosine NB Base and 15 parts of oleic acid.

EXAMPLE III

An ink composition was formed by admixing 62.5 parts of oleyl alcohol (cosmetic grade-Adol 90), 25 parts of nigrosine base, and 12.5 parts of oleic acid.

EXAMPLE IV

An ink composition was formed by admixing 70 parts of oleyl alcohol (cosmetic grade-Adol 90), 20 parts of nigrosine base, and 10 parts of oleic acid.

EXAMPLE V

An ink composition was formed by adding to the ink of Example IV 1% carbon black (Mogul L) and grinding the mixture in a ball mill for two days in the presence of Burundum grinding media (aluminum oxide) until a suitable dispersion was obtained.

EXAMPLE VI

An ink composition was formed by admixing 86 parts of oleyl alcohol, 6 parts Nigrosine NB Base, 3 parts oleic acid and 5 parts carbon black (Mogul L) and grinding the composition in a ball mill for two days until a suitable dispersion was obtained.

EXAMPLE VII

An ink composition was formed by admixing 76 parts of oleyl alcohol, 12 parts of Nigrosine NB Base, 6 parts oleic acid, 6 parts of carbon black (Mogul L) and grinding the mixture in a ball mill for two days until a suitable dispersion was obtained.

EXAMPLE VIII

A 10% solution of partially hydrolyzed polyvinyl acetate (DuPont-Elvanol 50-42) was formed by adding 10 parts of the polymer to 90 parts of water and heating in a hot water bath. The solution was quite viscous.

An emulsion was formed by admixing one part of the ink of Example IV with nine parts of the above polymer solution.

The resulting emulsion was coated on a 0.3 mil Mylar sheet with a No. 12 Mayer-rod and the continuous films formed were both air dried and dried at 122°F. The resultant transfer sheets gave good prints and appeared to be a true two phase system having ink dispersed in a continuous polymer phase.

EXAMPLE IX

In the manner of Example VIII, a series of transfer sheets were prepared employing the polymer solution of Example VIII and the ink of Example III, varying the ink polymer ratio in the dry image producing layer. The coatings were applied to a 2 mil Mylar substrate.

| Trial | Ink-Dry Resin Ratio | Weight of Ink (parts) | Weight of 10% Resin Solution (parts) | Dried Coating Quality | Transfer |
|---|---|---|---|---|---|
| 1 | 1.5/1 | 13 | 87 | Continuous | Good |
| 2 | 2.0/1 | 16.7 | 83.3 | " | Good, Darker than 1 |
| 3 | 2.5/1 | 20 | 80 | " | Good, Darker than 2 |
| 4 | 3.0/1 | 23 | 77 | " | Good, Darker than 3 |

To the emulsion of Trial 4 there were added varying amounts of water, i.e. 2, 4, 6 and 10 parts and additional transfer sheets prepared from each. In each case, satisfactory transfer was obtained.

EXAMPLE X 14 parts of a 10% solution of a partially hydrolyzed polyvinyl acetate (87.2-89.2% hydrolysis-DuPont Evanol 50-42) was admixed with 4.6 parts of a preformed dispersion of a hydroxyethyl ether of starch (Penick and Ford Ltd.-Penford 380) (3:4 Penford 380/$H_2O$), 2 parts of the ink of Example V, and 2 parts of the ink of Example VI to form an emulsion. To the emulsion was then added 0.5 drop of 28% ammonium hydroxide per 10 grams of emulsion.

The emulsion was coated upon a Mylar sheet using a No. 16 Mayer-rod. A Monarch Marking Systems, Inc. (Dayton, Ohio) high speed drum line printer produced characters on paper having good character form, dark color, and excellent smudge resistance.

EXAMPLE XI

An ink emulsion comprising 3500 parts of a 10% solution of partially hydrolyzed polyvinyl acetate (Elvanol 50-42), 720 parts of the ink of Example IV and 10 parts of 28% ammonium hydroxide were coated upon a .3 mil Mylar ribbon to provide a 0.3–0.6 mil dried coating. The resultant transfer element was utilized in a Monarch Marking Systems, Inc. high speed drum line printer at a pressure of 9 (11 lightest-1 hardest pressure), 21 passes were made. Kidder densitometer readings (100 perfect reflectance — 0 perfect absorption) were made at 1, 4, 7, 10, 13, 16 and 19 passes.

On the samples measured there was very little difference bewteen the No. 1 and No. 19 Kidder readings (measuring in the infra-red), although the No. 1 prints were visually darker than the No. 19 prints.

| Pass No. | Kidder Reading | | | | | |
|---|---|---|---|---|---|---|
| No. 1 | 28 | 24 | 26 | 33 | 15 | 23 |
| No. 10 | 22 | 30 | 29 | 17 | 23 | 34 |
| No. 19 | 36 | 26 | 26 | 29 | 25 | 25 |

EXAMPLE XII

An emulsion was formed by admixing 4.5 parts of a 10% solution of partially hydrolyzed polyvinyl acetate (Elvanol 50-42) .8 part of a polyvinyl acetate emulsion (DuPont Elvacet 81-900, 55% solids) and 1.5 parts of the ink of Example IV.

The resultant emulsion was coated on 0.3 mil Mylar with a No. 24 Mayer-rod and dried in an oven at 120°F. Adhesion was excellent and good sharp pencil transfers were obtained on paper. The transfer did not smudge.

EXAMPLE XIII 10 grams of an emulsion were formed by admixing 75 parts of a 10% solution of partially hydrolyzed polyvinyl acetate (Elvanol 50-42), 5 parts of cornstarch (Argo starch), 20 parts of the ink of the Example VII, and 20 drops of a 1% aqueous solution of copper sulfate containing one drop of 28% ammonium hydroxide per ml. of copper sulfate solution.

Highly useful transfer elements were prepared from this emulsion by application of the emulsion to a Mylar film followed by drying the resultant article.

In the above examples other materials, such as those described hereinabove, may be substituted for those exemplified to achieve results within the scope of this invention. Likewise, the proportions of the materials employed may be varied as described above. While the image receiving material exemplified is paper, other preferably ink dispersant absorbent image receiving materials may be used as image receiving material. While the base material for the transfer element is preferably Mylar, preferably 0.3–0.5 mil thick, other base materials and/or thickness may be employed. As recognized in the art, the thinner the base material, the sharper the image that can be expected. While the image forming coating on the base is preferably between about 0.3 to about 0.8 mil dry film, thinner or thicker coats may be formed and employed depending on the intended use.

What is claimed is:

1. An image producing transfer element comprising a non-absorbent treated paper, fabric or plastic film base having a coating comprising:

a. a continuous phase comprising a partially hydrolyzed polyvinyl acetate polymer hydrolyzed to the extent of between about 80% and about 95%, b. a pressure expressible image forming discontinuous phase comprising:

i. at least about 40% by weight of a vehicle comprising at least one $C_{12}$ to $C_{20}$ aliphatic alcohol having an even number of carbon atoms, said vehicle having a freezing point below about 20°C., having dispersed therein ii. a colorant which is a dye, a pigment or a combination thereof, and wherein the ratio of polymer to the discontinuous phase (*b*) is between about 1:1 and about 1:3.

2. An image producing transfer element, as in claim 1, comprising a plastic film having a coating comprising:

a. a continuous phase comprising a partially hydrolyzed polyvinyl acetate polymer, hydrolyzed to the extent of between about 80% and about 95%, b. a pressure expressible image forming discontinuous phase comprising:

I. a vehicle comprising at lease one $C_{12}$ to $C_{20}$ aliphatic alcohol having an even number of carbon atoms, said vehicle having a freezing point below about 20°C., having dispersed therein ii. a dye base colorant combined with iii. a fatty acid, the amount of said fatty acid being a color developing amount less than the amount which combines with all said dye base, and wherein the ratio of polymer to the discontinuous phase (*b*) is between about 1:1 and about 1:3.

3. A transfer element, as in claim 2, wherein the vehicle comprises oleyl alcohol.

4. A transfer element, as in claim 2, which contains, in the continuous phase, a minor transfer rate effecting amount of a resin selected from the group consisting of polyvinyl alcohol and polyvinyl acetate.

5. A transfer element, as in claim 2, which contains a particulate filler in the continuous phase.

6. A transfer element, as in claim 5, where the particulate filler is selected from the group consisting of starch and chemically modified starch.

7. A transfer element, as in claim 2, which contains, in the continuous phase, a minor amount of a polyvalent metal salt.

8. A transfer element, as in claim 2, comprising a polyester resin film having a coating thereon comprising:

a. a continuous phase comprising a partially hydrolyzed polyvinyl acetate polymer, hydrolyzed to the extent of between about 80% and to about 95%, b. a discontinuous pressure expressible image forming dispersed phase comprising:

i. about 40% to about 85% by weight of oleyl alcohol, ii. a nigrosine base colorant combined with iii. oleic acid, the amount of said oleic acid being a color developing amount less than the amount which forms a salt with all said nigrosine base, (*a*) and (*b*) being present in a ratio of (*a*) to (*b*) of about 1:1 to about 1:3.

9. A transfer element, as in claim 8, where the ratio (*a*) to (*b*) is between about 1:1.5 to about 1:2.5.

10. A transfer element, as in claim 8, which contains, in the continuous phase, a minor transfer rate effecting amount of a resin selected from the group consisting of polyvinyl alcohol and polyvinyl acetate.

11. A transfer element, as in claim 8, which contains a particulate filler in the continuous phase.

12. A transfer element, as in claim 11, where the particulate filler is selected from the group consisting of starch and chemically modified starch.

13. A transfer element, as in claim 8, which contains, in the continuous phase, a minor amount of a polyvalent metal salt.

14. A method of forming a transfer element which comprises coating a non-absorbent base material with an emulsion comprising:

a. a continuous aqueous phase comprising a solubilized partially hydrolyzed polyvinyl acetate polymer, hydrolyzed to the extent of between about 80% and about 95%, having dispersed therein b. a discontinuous dispersed phase comprising:

i. at least about 40% by weight of a vehicle comprising at least one $C_{12}$ to $C_{20}$ aliphatic alcohol containing an even number of carbon atoms, said vehicle having a freezing point below about 20°C., having dispersed therein ii. a colorant which is a dye, a pigment or a combination thereof and wherein the ratio of polymer to discontinuous phase (*b*) is between about 1:1 and about 1:3 and drying the resultant coated article.

15. A method, as in claim 14, wherein the emulsion is coated in a manner and at a rate to cause wetting out of the base material to provide a continuous coating.

16. A method of forming a transfer element which comprises a. forming an ink comprising i. at least about 40% by weight of a vehicle comprising at least one $C_{12}$ to $C_{20}$ aliphatic alcohol containing an even number of carbon atoms, said vehicle having a freezing point below about 20°C., having dispersed therein ii. a dye base which has been reacted with a fatty acid, the amount of fatty acid present in the ink being a dye base color developing amount less than the amount which reacts with all of the dye base present, b. forming an emulsion of said ink in an aqueous solution comprising a partially hydrolyzed polyvinyl acetate polymer hydrolyzed to the extent of between about 80% and about 95%, the ratio of polymer to ink (*a*) being between about 1:1 and about 1:3, c. coating said emulsion upon a non-absorbent treated paper, fabric or plastic film base material, d. drying the resultant coated article.

17. A method, as in claim 16, wherein the dye base is a nigrosine dye base and the fatty acid is oleic acid.

18. A method, as in claim 17, wherein the base material is a polyester film.

19. A method, as in claim 16, where the emulsion contains about 5% or less based on the total composition of ammonium hydroxide.

* * * * *

UNITED STATES PATENT OFFICE
CERTIFICATE OF CORRECTION

PATENT NO. : 3,946,138

DATED : March 23, 1976

INVENTOR(S) : Frederick L. Jones

It is certified that error appears in the above-identified patent and that said Letters Patent are hereby corrected as shown below:

In claim 2, column 7, line 36, delete ", as in claim 1,".

Signed and Sealed this

*Eighteenth* Day of *April 1978*

[SEAL]

*Attest:*

RUTH C. MASON
*Attesting Officer*

LUTRELLE F. PARKER
*Acting Commissioner of Patents and Trademarks*